United States Patent [19]
Chang et al.

[11] Patent Number: 5,890,067
[45] Date of Patent: *Mar. 30, 1999

[54] MULTI-BEAM ANTENNA ARRAYS FOR BASE STATIONS IN WHICH THE CHANNEL FOLLOWS THE MOBILE UNIT

[75] Inventors: Chu Rui Chang; Hua Jiang, both of Plano, Tex.

[73] Assignee: BNR Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 670,635
[22] Filed: Jun. 26, 1996
[51] Int. Cl.$^6$ ....................................... H04Q 7/00
[52] U.S. Cl. .......................... 455/446; 455/453; 455/442; 455/513; 455/562
[58] Field of Search ..................................... 455/446, 450, 455/453, 436, 442, 62, 562, 561, 509, 513, 100; 342/368; 370/329, 331, 332, 334

[56] References Cited

U.S. PATENT DOCUMENTS

| | | |
|---|---|---|
| 5,095,531 | 3/1992 | Ito .............................................. 455/33 |
| 5,109,528 | 4/1992 | Uddenfeldt ............................... 455/442 |
| 5,140,695 | 8/1992 | Yasuda et al. ........................... 455/34.1 |
| 5,265,263 | 11/1993 | Ramsdale et al. ..................... 455/33.2 |
| 5,276,907 | 1/1994 | Meidan ................................ 455/453 X |
| 5,339,086 | 8/1994 | DeLuca et al. .......................... 342/371 |
| 5,345,499 | 7/1995 | Benveniste ................................. 379/59 |
| 5,392,453 | 2/1995 | Gudmundson .......................... 455/33.2 |
| 5,396,645 | 3/1995 | Huff ........................................ 455/33.4 |
| 5,423,066 | 6/1995 | Sasuta ................................. 455/513 X |
| 5,457,810 | 10/1995 | Ivanov et al. ........................... 455/33.2 |
| 5,499,395 | 3/1996 | Doi et al. ............................. 455/561 X |
| 5,504,937 | 4/1996 | Kangas . |
| 5,649,293 | 7/1997 | Reed ....................................... 455/453 |
| 5,714,957 | 2/1998 | Searle et al. ............................. 342/374 |

FOREIGN PATENT DOCUMENTS

| | | |
|---|---|---|
| 562743 | 9/1993 | European Pat. Off. . |
| 589279 | 3/1994 | European Pat. Off. . |
| 0 647 978 | 4/1995 | European Pat. Off. . |
| 180438 | 7/1990 | Japan . |
| 2242806 | 10/1991 | United Kingdom . |
| 92/16061 | 9/1992 | WIPO . |
| 95/28813 | 10/1995 | WIPO . |

OTHER PUBLICATIONS

Katzela, et al., "Channel Assignment Schemes for Cellular Mobile Telecommunication Systems: A Comprehensive Survey," IEEE Personal Communications, vol. 3, No. 3, Jun. 1, 1996.

Kohno, et al., "Combination of an Adaptive Array Antenna and a Canceller of Interference for Direct–Sequence Spread-Spectrum Multiple–Access System," IEEE Journal on Selected Areas in Communications, vol. 8, No. 4, May 1990, pp. 675–682.

(List continued on next page.)

Primary Examiner—Thomas J. Mullen, Jr.
Attorney, Agent, or Firm—Finnegan, Henderson, Farabow, Garrett & Dunner, L.L.P.

[57] ABSTRACT

Cells in a radio telephone scheme are covered by beam-spots generated by multi-beam antenna system. Forward communication channels follow mobile units as they move between beam-spots. Additionally, each cell is divided into zones based on the mobile traffic patterns within the cell. Typically, there will be a high density zone covered by many, small area beam-spots, a medium density zone covered by two or three medium sized beam-spots, and a low density zone covered by one large beam-spot. As the mobile traffic patterns change throughout the day, multi-beam antenna dynamically reconfigures the zone and beam-spot layout for each cell, thereby keeping a nearly optimal zone and beam-spot configuration despite varying mobile traffic patterns.

23 Claims, 8 Drawing Sheets

OTHER PUBLICATIONS

Compton, Jr., "An Adaptive Array in a Spread–Spectrum Communication System," Proceedings of the IEEE, vol. 66, No. 3, Mar. 1978, pp. 289–298.

Liberti, Jr., et al., "Analytical Results for Capacity Improvements in CDMA," IEEE Transactions on Vehicular Technology, vol. 43, N. 3, Aug. 1994, pp. 680–690.

Naguib, et al., "Capacity Improvement with Base–Station Antenna Arrays in Cellular CDMA," IEEE Transactions on Vehicular Technology, vol. 43, No. 3, Aug. 1994, pp. 691–698.

Davies, et al., "Proposed Advanced Base Station Antennas for Future Cellular Mobile Radio Systems," A.T.R., vol. 22, No. 1, 1988, pp. 53–60.

Swales, et al., "The Performance Enhancement of Multi-beam Adaptive Base–Station Antennas for Cellular Land Mobile Radio Systems," IEEE Transactions on Vehicular Technology, vol. 39, No. 1, Feb. 1990, pp. 56–67.

Lee, "Applying the Intelligent Cell Concept to PCS," IEEE Transactions on Vehicular Technology, vol. 43, No. 3, Aug. 1994, pp. 672–679.

MULTI-BEAM ANTENNA ARRAYS FOR BASE STATIONS IN WHICH THE CHANNEL FOLLOWS THE MOBILE UNIT

BACKGROUND OF THE INVENTION

1. Field of the Invention

The present invention relates generally to cellular telephone systems. More particularly, this invention relates to multi-beam adaptive antenna arrays in which the communication channel follows the mobile unit.

2. Background of the Invention

Cellular telephone systems allowing radio communication with mobile wireless units ("mobiles") have become very popular. Generally, the mobile units are hand-held, personal communication units or vehicle mounted communication units (e.g., car phones). As a result of the increased popularity of cellular communications, some geographic areas, particularly cities, are becoming overloaded with cellular communication units to the point where the number of radio frequencies available for communication are not able to serve all of the mobile units. Thus, topologies for mobile communications systems that maximize the use of a finite number of radio frequencies have been developed.

The conventional topology used in cellular communication divides the area to be covered into a number of contiguous cells, each containing one or more base antennas for communicating with the mobile units. Each cell is assigned a number of unique cell communication frequencies which are usable throughout the cell area. The communication frequencies assigned to a cell are generally not utilized in an adjoining cell in order to reduce interference problems.

During a call, the two calling parties speak on one channel pair (i.e, a forward transmission channel and a reverse transmission channel). When a mobile unit moves out of the coverage area of a particular cell site, the reception becomes weak. The new cell site senses the weak signal and consequently requests a handoff to a new cell via an appropriate signal. The system switches the call to a new frequency channel or a different cell identification code in the new cell site without either interrupting the call or alerting the user. The user does not notice that the handoff occurred, and may continue talking as long as he or she desires.

When call traffic in a particular area increases, increased capacity may be generated by reducing the area covered by a particular cell, i.e., dividing the cell into multiple sectors or creating microcells by reducing the cell radius. For example, if a cell is split into four sectors, each being one-quarter of the size of the original, capacity is increased nearly four-fold. Naturally, the smaller the cell, the more handoffs are required in a cellular telephone system for a given capacity.

FIG. 1A illustrates a conventional cell 100 divided into three sectors 102, 104, and 106, arranged in a "pie-slice" configuration so that base station 107, located in center of cell 100, broadcasts to a predefined angular section of the cell. Cell 100 is allotted a fixed number of frequency channels (e.g., one-hundred twenty). When the mobile user density becomes too great for cell 100 to handle, that is, there are more mobile units in use than there are available channels, the system operators may decide to subdivide cell 100 into sectors 102, 104, and 106. This allows greater frequency reuse of channels, which increase the total capacity of cell 100.

FIG. 1B is a diagram illustrating the hierarchy of cell division in a conventional cell system. Cell 110 is at the top level. As previously discussed, multiple contiguous cells form the radio network. The cells may be divided into sectors, for example, sectors 112 and 114. Each mobile unit within a sector is allocated one of communication channels 116 through 118. Each communication channel 116 through 118 includes a pair of actual communication frequencies: a forward traffic channel (the communication channel from the base station to the mobile unit) and a reverse traffic channel (the communication channel from the mobile unit to the base station).

Although in the proper circumstances, cell sectorization increases cell capacity, certain problems can arise. When a sector is very narrow, that is, many sectors are used to fill a cell, irregular signal coverage will result because the radio transmissions that form the sector do not have well defined boundaries. Buildings and other structures exacerbate this problem.

A second, conventional method for increasing cell capacity is to lower the antenna height. Lowering the antenna height shrinks the cell radius. Thus, each cell becomes smaller and the total number of cells (and therefore mobile unit capacity) per unit area increases.

As traffic demand in a cell increases, conventional solutions of increasing capacity by sectorizing the cells and lowering the antenna height of each sector reach practical limits. For example, as the sector size is reduced, it becomes harder to confine the radio energy within the cell region using conventional antenna technology. As a result, cell overlapping occurs, increasing radio interference. Additionally, each additional microcell requires an additional base station. Base stations are expensive, especially in cities because of the high cost of real estate. Moreover, as the cell size is reduced, conventional handoff algorithms have difficulty in completing handoffs quickly enough to keep up with a mobile unit moving quickly, that is, a fast mobile unit. As a result, communication cut-off in mid-conversation may occur—a result unacceptable to most users.

One proposed solution for increasing radio capacity, which avoids some of the above mentioned problems, uses "smart" antennas (multi-beam adaptive array antennas). Smart antennas adjust their directional beam patterns to maximize the signal to noise ratio in a desired area. Multiple base stations arranged in a cell can be controlled as an adaptive antenna array to generate multiple beams focused into small "spots." Adjusting the amplitude and phase of each antenna element makes it possible, in real time, to steer each beam to track the motion of mobile units in the cell. The beam follows the mobile unit. This antenna topology takes maximum advantage of spatial filtering (i.e., the radio waves are only transmitted to the spatial area where they are required) and therefore minimizes interference elsewhere. Interference minimization is important because interference is the primary capacity limiter for cellular communication systems.

FIG. 2 is a diagram illustrating the hierarchy of cell division in a conventional adaptive antenna array cellular system. At the top level, a cell 200 contains multiple, movable beams 202 through 204. Each mobile unit is tracked by a beam and communicates over one or more of channels 206 through 208.

Two main functions that make the adaptive antenna array "smart" are "beam forming" and "mobile tracking". Beam forming refers to the ability of the adaptive antenna array to focus the beam into a relatively small area.

Although beam forming is relatively straight-forward, mobile tracking is complicated and computationally intensive. Current mobile tracking systems use feedback and estimation mechanisms to predict the future location of the mobile unit. The systems then calculate the optimum phase and amplitude values to steer the beam to the predicted location. If the prediction is correct, the beam essentially "follows" the mobile unit.

There are two main problems associated with prior art adaptive antenna systems. First, present real-time control and tracking algorithms are very complicated, requiring expensive hardware and complex software, making adaptive antenna systems expensive. Second, the primary purpose of mobile tracking is to reduce the handoff rate, but the opposite result occurs. The number of subscribers in a cell usually far exceeds the number of beams an adaptive antenna is capable of generating, so the beams must follow groups of subscribers. This is not a problem for cellular car-phone systems, because adaptive antenna arrays can track a group of mobile units moving along a road. Personal, hand-held applications, on the other hand cause a problem because motions for such pedestrians are essentially random. A group of pedestrians may form and split at any time making it difficult for the beam to follow a "group". Because there are not enough beams to follow each individual subscriber, the rate of handoff between beam-spots remains high, reducing the theoretical advantages of the adaptive antenna system.

The present invention has significant advantage over prior art systems. Its communication capacity is as high as that of a conventional adaptive antenna system because spatial filtering is maintained, but it eliminates real-time beam forming and mobile tracking, the expensive and complicated components of conventional adaptive antennas. The present invention is also less expensive than a fixed microcell system with equal radio capacity. Additionally, when installed in an area previously containing a single conventional cell, the present invention can cover a high traffic area inside of the cell while introducing less interference than the conventional method of creating new sectors within a pre-existing cell.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, one aspect of the invention is a method of communicating between a mobile unit and a base station within a cell of a cellular communication system. The method comprises a plurality of steps, including radiating an array of geographically spaced beam-spots within the cell, each of said beam-spots having a plurality of communication channels, at least one of the communication channels being assigned to the mobile unit. Additionally, the method senses at the base station received signal strength of the mobile unit communicating in the cell and radiates the communication channel assigned to the mobile unit to a selected number of beam-spots based on the received signal strength.

In another aspect, a radio based telephone system comprises an adaptive antenna array for providing reconfigurable beam-spots within a predefined area, each beam-spot containing one or more channels assigned to mobile units using the telephone system, the channels being controlled such that they are deactivated when a mobile unit exits a first beam-spot and activated when the mobile unit enters a second of the beam-spots.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENT

In the present invention, cells in a radio telephone scheme are covered by beam-spots generated by a multi-beam antenna system. Unlike prior art radio communication schemes using adaptive antennas that track mobile units with their beams, forward traffic channels in the present invention follow the mobiles as they move between beam-spots. As a result, the present invention is more efficient and less costly than prior art adaptive antenna systems.

Additionally, each cell in the present invention may be divided into zones based on the mobile traffic patterns within the cell. Typically, there will be a high density zone covered by many, small area beam-spots, a medium density zone covered by two or three medium sized beam-spots, and a low density zone covered by one large beam-spot. As mobile traffic patterns change throughout the day, this invention dynamically reconfigures the zone and beam-spot layout for each cell, to keep a nearly optimal zone and beam-spot configuration despite varying mobile traffic patterns.

The present invention can be implemented in code division multiple access (CDMA) cellular communication system, time division multiple access (TDMA) system, or a frequency division multiple access (FDMA) system.

Reference will now be made in detail to the present preferred embodiments of the invention, examples of which are illustrated in the accompanying drawings. Wherever possible, the same reference numbers will be used throughout the drawings to refer to the same or like parts.

Figure 1A:
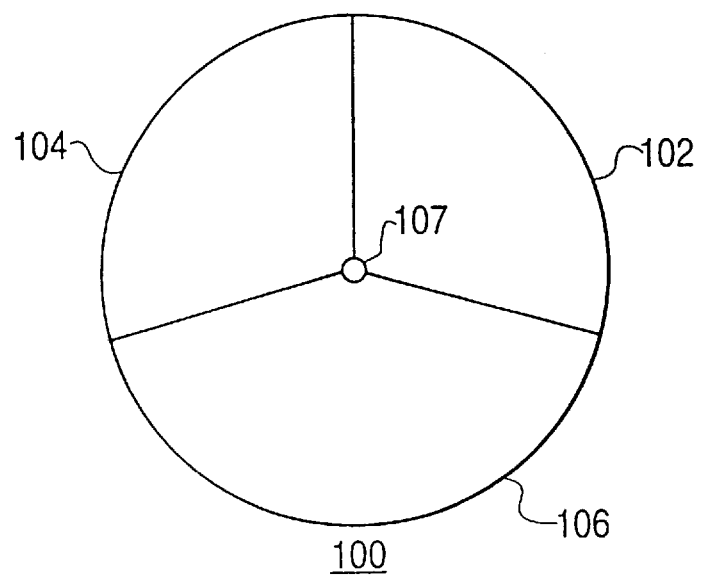
FIG. 1A is a diagram illustrating a conventional cell divided into three sectors.
Figure 1B:
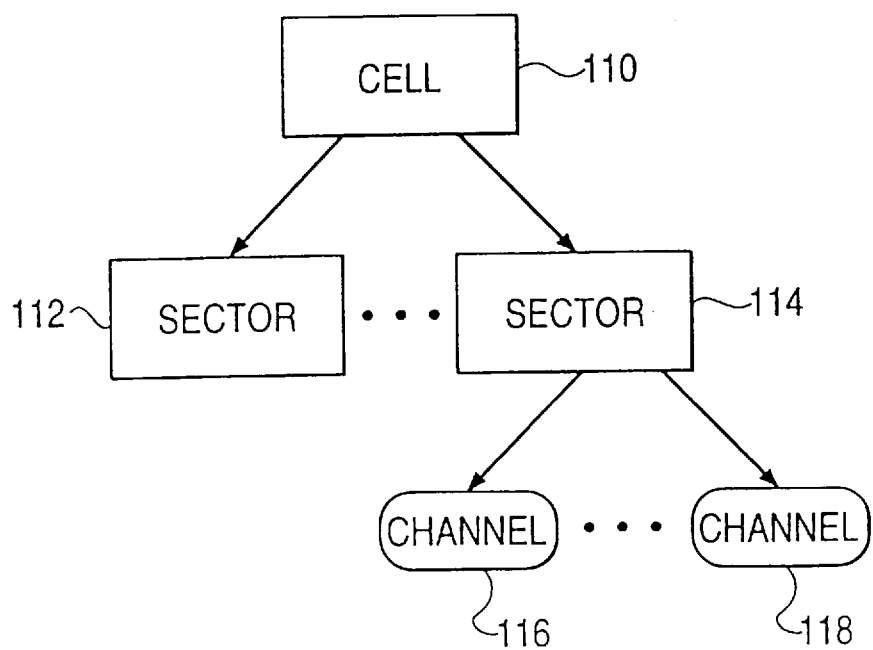
FIG. 1B is a diagram of the hierarchy of cell division in the system shown in FIG. 1A.
Figure 2:
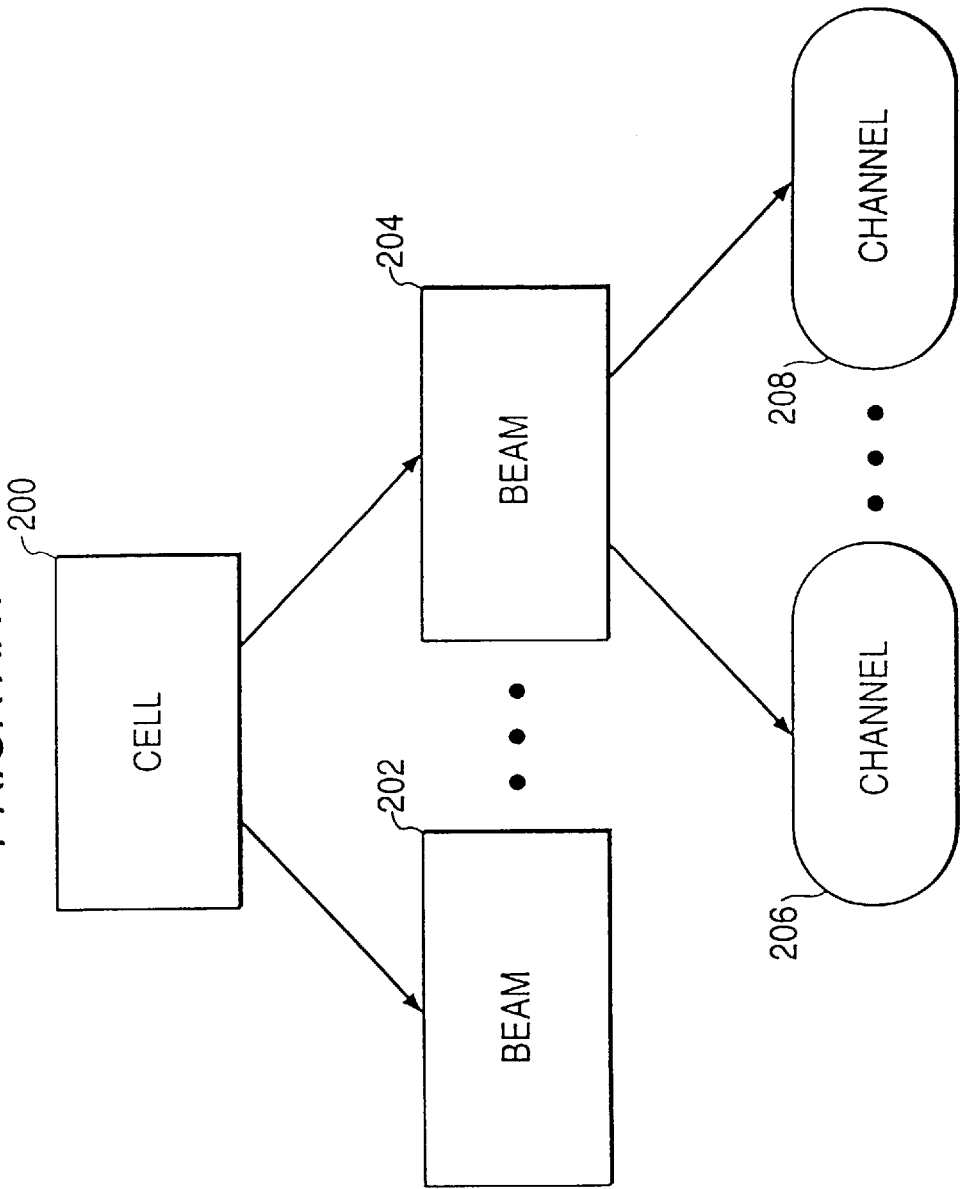
FIG. 2 is a diagram illustrating the hierarchy of cell division in a conventional adaptive antenna array cellular system.
Figure 3:
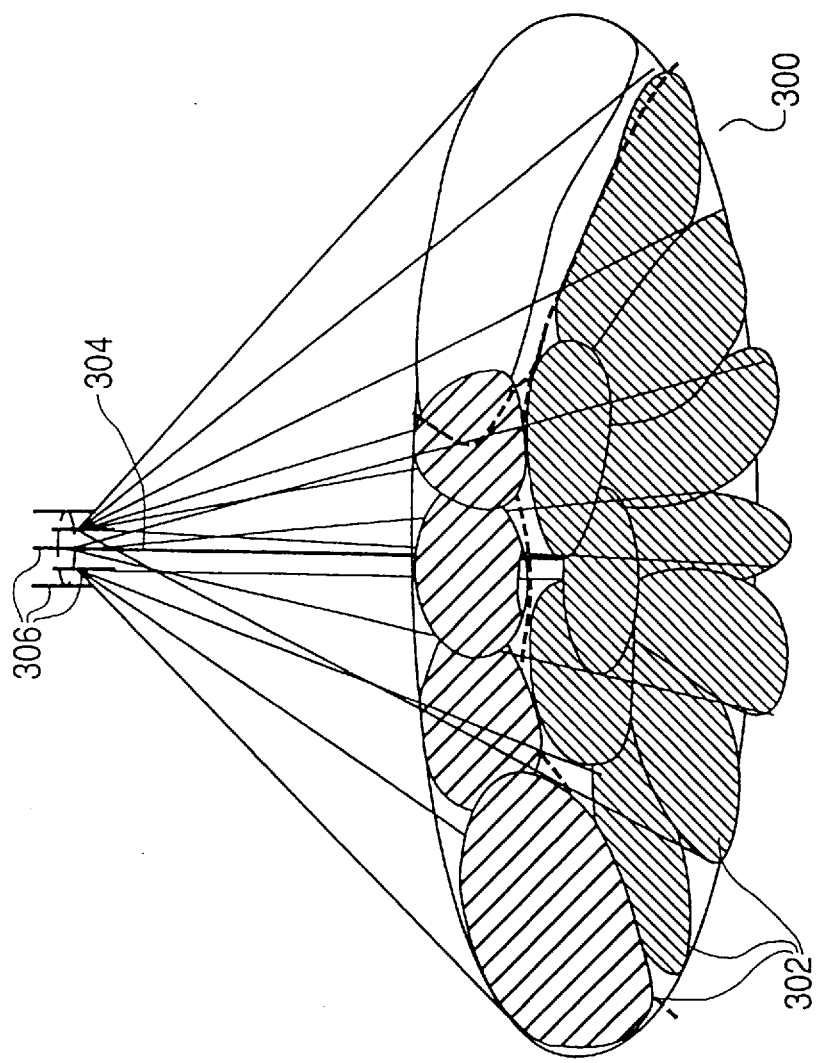
FIG. 3 is a diagram illustrating the adaptive array antenna system for reforming the beams-spots according to the present invention.

FIG. 3 is a diagram illustrating the adaptive array antenna system for rearranging the beam-spots according to the present invention. In FIG. 3, cell 300 is covered with multiple beam-spots 302. Each beam-spot 302 is produced from antennas 306 in multi-beam adaptive antenna array 304. Multi-beam adaptive antenna array 304 contains N antennas 306, spaced from one another by about half a wavelength. N antennas 306 give the system N−1 degrees of freedom. N is typically significantly greater than one, although more or less may be used depending on the specific situation.

Adaptive antenna array 304 transmits forward channels and receives corresponding reverse channels. A beam forming network, located at the base of the adaptive antenna array 304, which may take the form of specialized hardware or general purpose computers, controls the amplitude and phase of the signals transmitted by the antennas 306 to adjust the beam-spots 302. Additionally, hardware and/or software at the base controls channel-following, traffic-monitoring, and received signal strength monitoring, all discussed below, as well as any other control functions of the adaptive antenna array 304.

Figure 4:
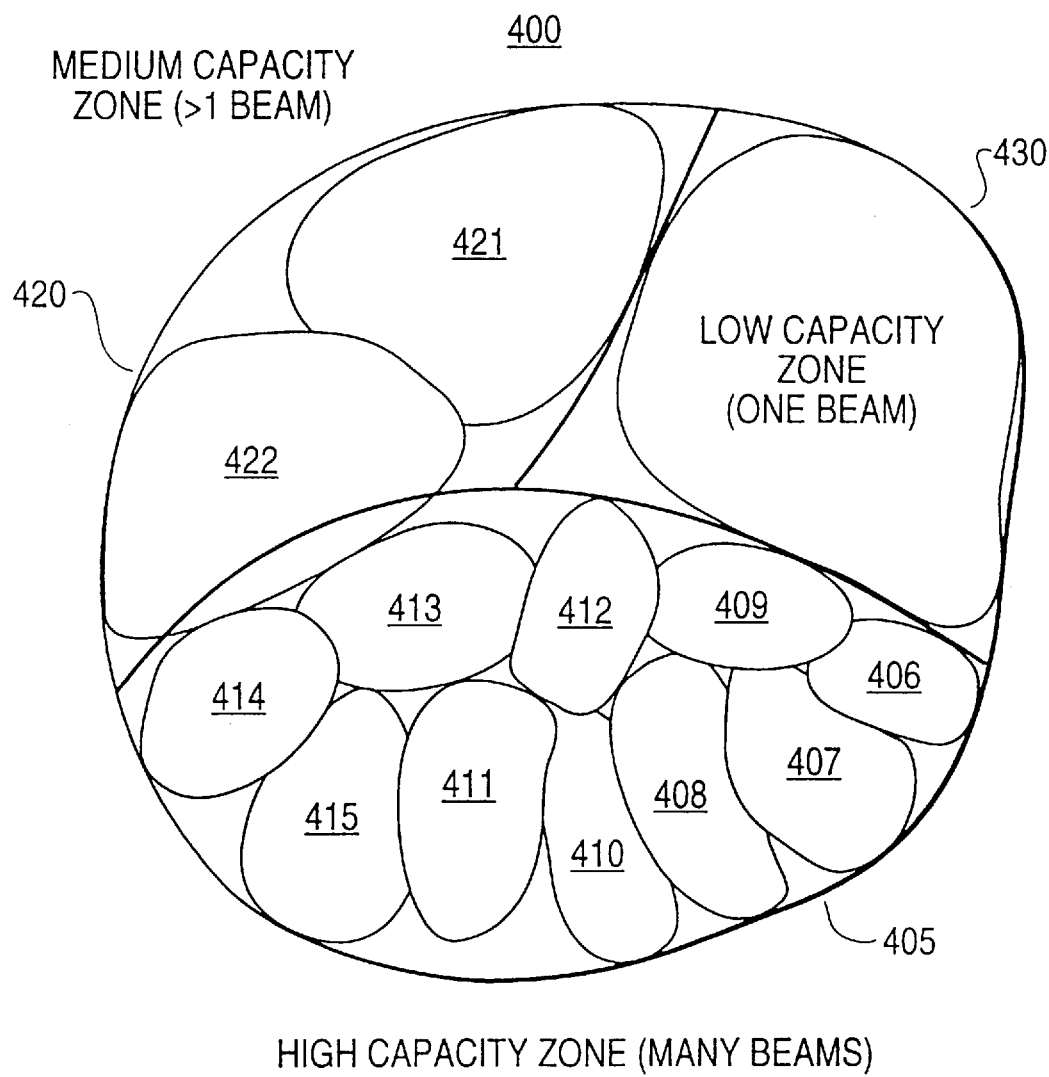
FIG. 4 is a diagram showing a cell divided into zones and further divided into beam-spots according to the present invention.

FIG. 4 is a top down diagram of a cell divided into zones and further divided into beam-spots. Each beam-spot is formed by a multi-beam antenna system that can adjust the individual spot size and location. Cell 400 is divided into three zones: high capacity zone 405, medium capacity zone 420, and low capacity zone 430. In practice, the system dynamically rearranges and disperses zones based on mobile density and movement patterns such that cells may have different numbers of zones. Zone 405 includes beam-spots 406 through 415, zone 420 includes beam spots 421 and 422, and zone 430 includes beam-spot 430.

Figure 5:
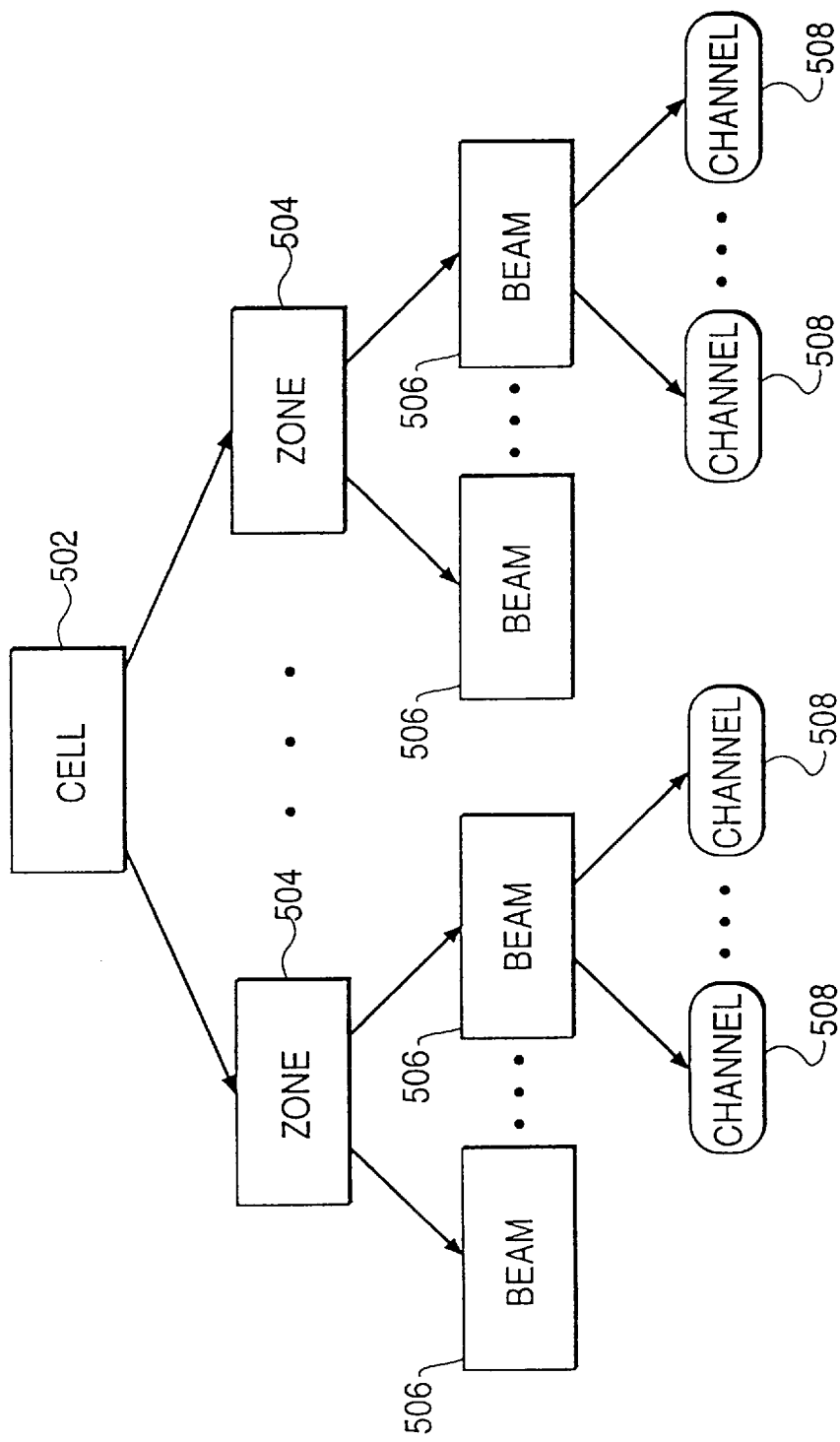
FIG. 5 is a diagram illustrating the hierarchy of cell division in a preferred embodiment of the invention.

FIG. 5 is a diagram illustrating the hierarchy of cell division in the preferred embodiment of the present invention. At the top level are cells 502 divided into one or more zones 504. Zones 504 are further divided into beams 506. Beams 506 each have several channels 508 assigned to individual mobiles. In the preferred embodiment, the beams do not track the mobile units in real time as conventional adaptive antenna systems. Instead, the mobile unit's channel follows it as it moves through the beams. However, the beams are "movable" in the sense that the system periodically reconfigures the arrangement of the beam-spots within a cell. The system may change the number of beam-spots, the size of the beam-spots, or the locations of the beam-spots. The system reconfigures the beams when the mobile unit densities in the cell change substantially to make reconfiguration desirable.

All of the beam-spots in zone 405 (FIG. 4) share the same control channel. Similarly, the beam-spots 421 and 422 share a second control channel and beam-spot 430 uses yet another control channel. A mobile unit moving into or out of a zone or cell performs a handoff with the new zone or cell. Because all of the beam-spots within a zone share the same control channel, no handoff is required for a mobile unit moving between beam-spots in a zone. Instead, the communication channel pair (the forward channel from the base station to the mobile unit and the reverse channel from the mobile unit to the base station) simply follows the mobile unit.

When the mobile unit is in a beam-spot, for example, beam-spot 412, the multi-beam antenna system transmits the forward channel to only beam-spot 412. As the mobile unit moves into a neighboring beam-spot, for example, beam-spot 409, the system senses that the reverse channel signal (the communication channel from the mobile unit to the base station) is stronger in this new beam-spot and consequently turns off the forward channel from beam-spot 412 and turns on the same forward channel signal to beam-spot 409. Thus, the system switches the transmitted channel between the beam-spots to follow the mobile unit.

Channel following is not difficult to implement. The beam-spot receiving the strongest reverse channel signal is the "channel-on" spot. Additionally, channel-following can be performed quickly, requiring only a simple switching operation.

Preferably, the determination as to which beam-spot a mobile unit is in is implemented by a scanning receiver and control circuitry at the base of adaptive antenna array 304.

Figure 6:
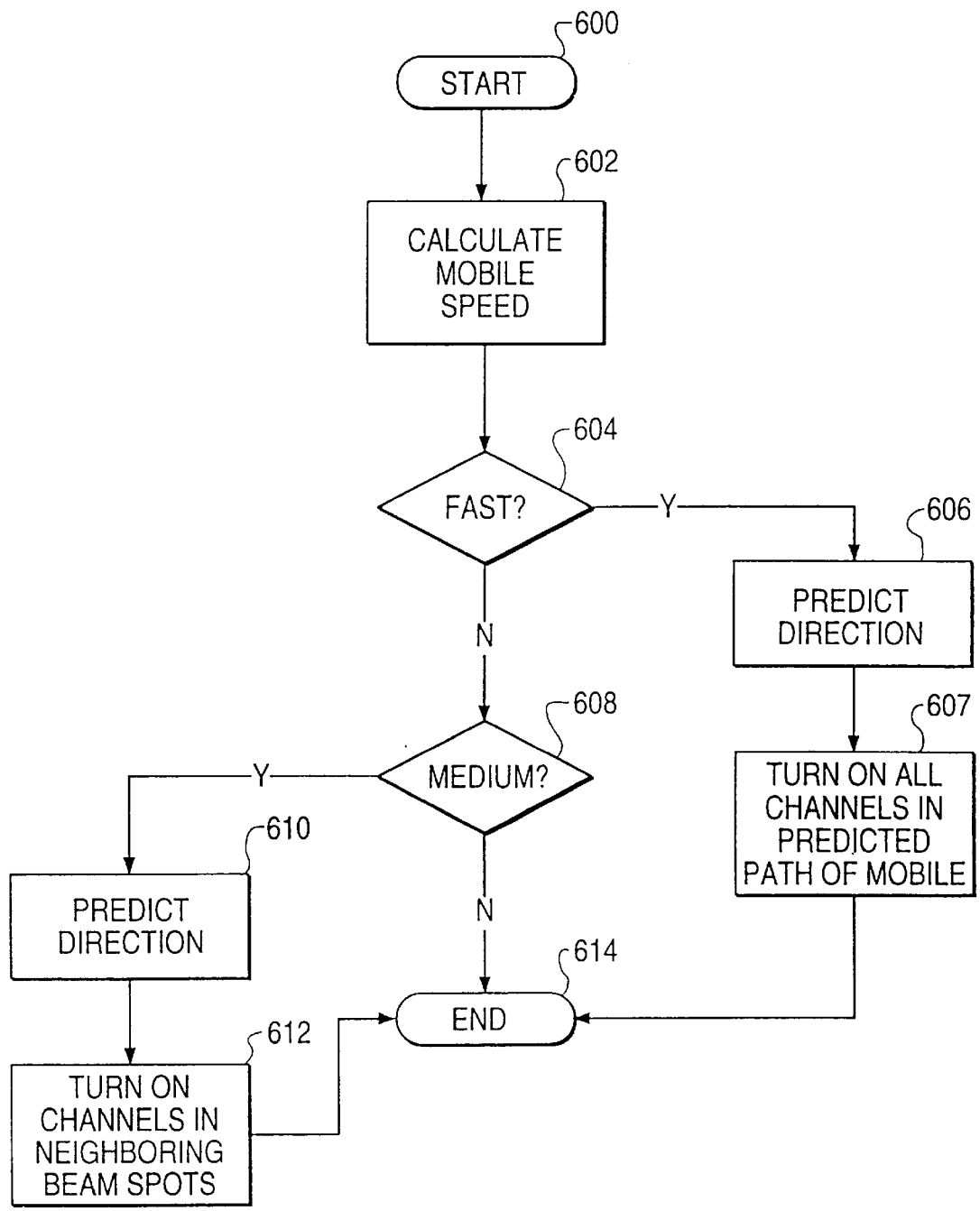
FIG. 6 is a flowchart illustrating an algorithm used by one embodiment of the invention.

Although the above described channel-following technique works well in most situations, fast moving mobile units in high density areas may cause too many on/off channel switches for the system. FIG. 6 is a flowchart illustrating the preferred solution to this problem, which allows fast moving mobile units to move through beam-spots in a zone without repeated, rapid channel switches. For fast moving mobile units, the system must estimate the speed of each mobile unit based on the time interval between when the mobile unit enters a beam-spot and when it leaves that beam-spot (step 602). This time interval is called the mobile unit's dwell time. Whether the unit is a fast mobile depends on its dwell time (step 604). If the mobile unit's dwell time is below a predetermined threshold, the mobile unit is a fast mobile.

If the mobile unit is not a fast mobile, the mobile unit may be a medium speed mobile (step 608). A medium speed mobile is a mobile unit whose dwell time is above the predetermined threshold but below a second, higher threshold.

If the mobile unit is determined to be a fast mobile (step 604), the system estimates the direction of the mobile unit (step 606), based on its movement history, and turns on all the channels in the mobile unit's zone that the direction prediction step 606 predicts the mobile unit will travel through (step 607). For example, referring to FIG. 4, if a fast moving mobile unit enters beam-spot 410 from beam-spot 411, the system may turn on the traffic channels in beam-spot 407 associated with the mobile unit. At the same time, or at a later time, the system will turn off the corresponding channels in beam-spot 415. The traffic channels associated with the mobile unit in beam-spots 411, 410, and 408 remain activated from a previous operation. When the mobile unit exits beam-spot 410 and enters 408, the system will turn on its channel in beam-spot 406 and turn off its channel in beam-spot 411. The channel in beam-spot 407 remains on from a previous activation. Additionally, if the system determines that the mobile unit may enter beam-spot 409, it will turn on its channel in beam-spot 409. In this manner, the system switching load is decreased—reducing the hardware required and increasing reliability.

If the mobile unit is a medium speed mobile, the system also predicts its direction (step 610). The system, however, does not turn on the channels as far in advance as for fast moving mobiles, but instead, activates channels just in neighboring beam-spots (step 612). For example, if the mobile unit from the previous example again enters beam-spot 410, but this time moving at medium speed, the mobile's channel in beam-spot 408 would be turned on and its channel in beam-spot 411 would be turned off. Similarly, when the medium speed mobile leaves beam-spot 410 and enters 408, its channel in beam-spot 410 would be turned off and its channel in beam-spot 407 turned on.

If the mobile unit is neither a fast nor medium speed mobile, it is, by default, a slow mobile. With slow mobiles, their channel is turned on only in their immediate beam-spot.

Figure 7:
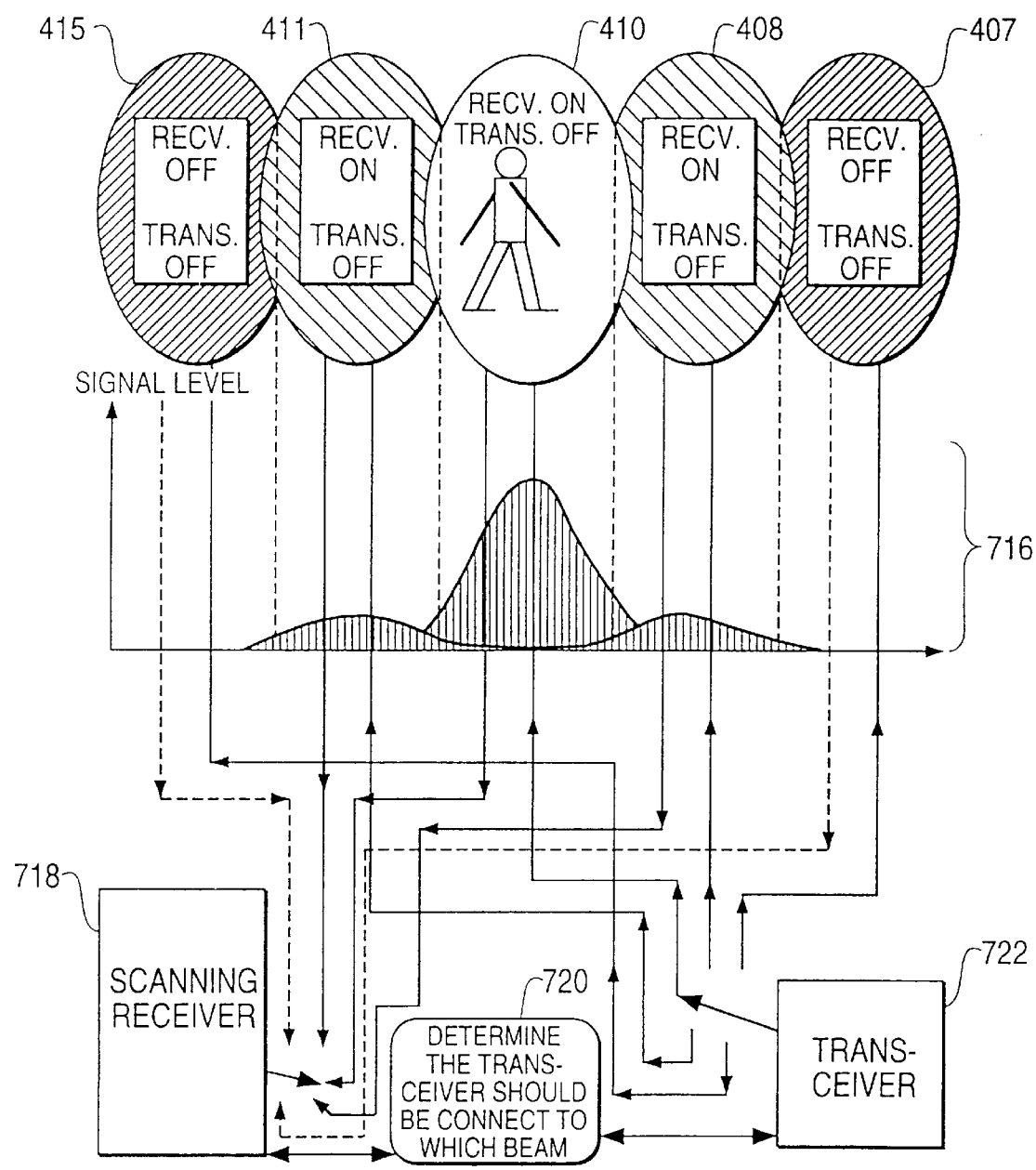
FIG. 7 is diagram illustrating, for a slow moving mobile unit, the on/off relationship between the reverse channel (receivers), forward channel (transmitters), and the mobile unit.
Figure 8:
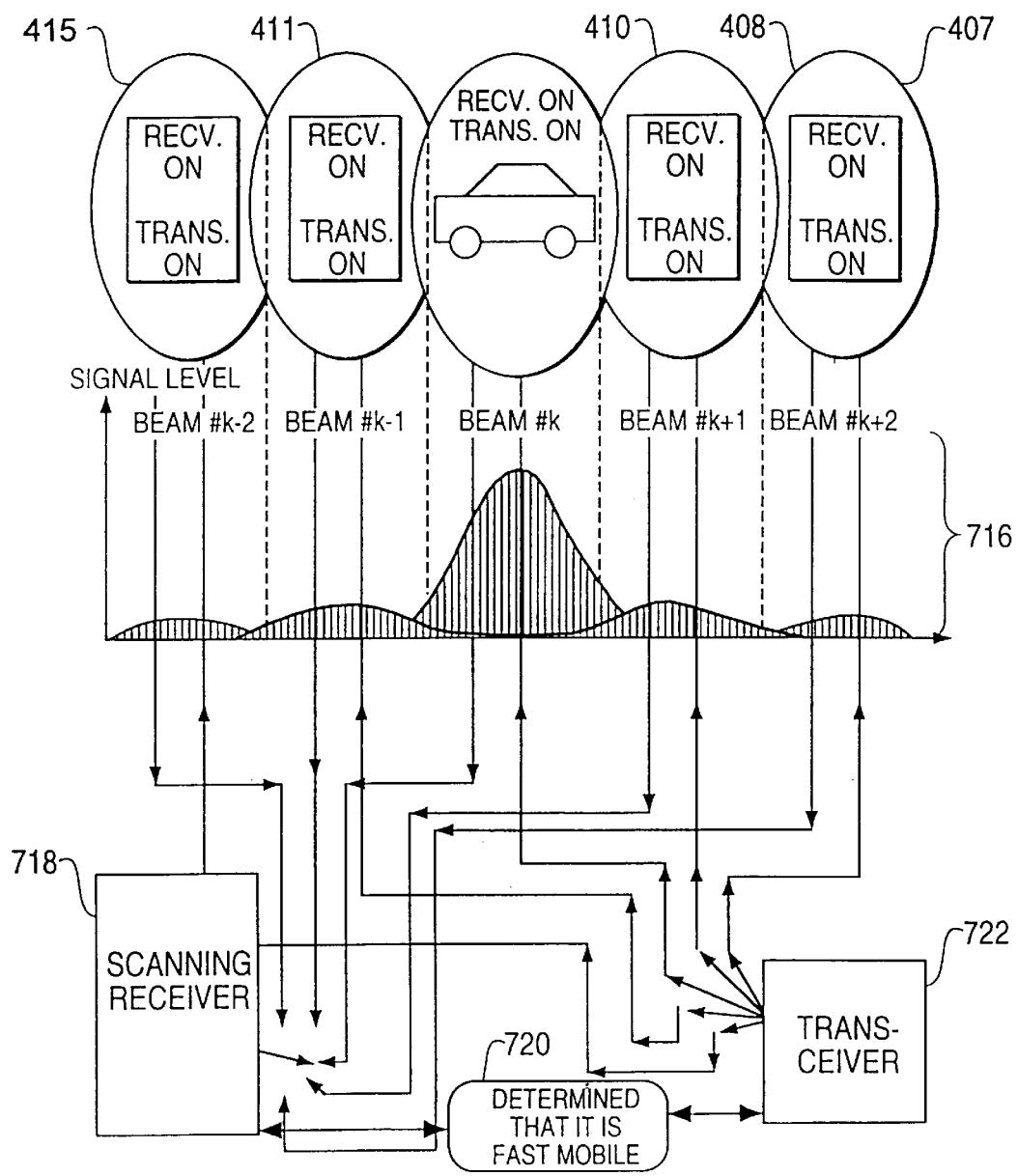
FIG. 8 is a diagram illustrating, for a fast moving mobile unit, the on/off relationship between the reverse channel (receivers), forward channel (transmitters), and the mobile unit.

FIGS. 7 and 8 are diagrams illustrating on/off relationships between transceivers 722, which receive the reverse traffic channel and transmit the forward traffic channel, scanning receivers 718, which sense the mobile unit's location, and a mobile unit moving through beam-spots.

In FIG. 7, beam-spot 410 represents a beam-spot containing a slow moving mobile. Beam-spots 415, 411, 408, and 407 represent surrounding beam-spots, as shown in FIG. 4. Scanning receiver 718 scans the beam-spot 410 containing the mobile unit and its two neighboring beam-spots, 411 and 408. Transceiver 722, for each mobile unit, represents the forward traffic channel transmitter and the reverse traffic channel receiver. Element 720 controls elements 718 and 722. Graph 716 illustrates the received reverse signal level, by the scanning receiver 718, at beam-spots 415, 411, 410, 408, and 407, from the mobile unit in beam-spot 410. As the graph shows, the received signal level is highest from the beam-spot that the mobile unit is in and is lower in the two neighboring beam-spots. Scanning receiver 718 does not scan beam-spots 407 and 415, so no signal is detected there.

FIG. 8 is similar to FIG. 7, except that FIG. 8 shows a fast moving mobile in beam-spot 410. Because the mobile unit is a fast one, transceiver 722 is turned on in all of the illustrated beam-spots. Additionally, scanning receiver 718 scans all of beam-spots 407, 408, 410, 411, and 415.

As was previously mentioned, the beam-spots in the present invention do not move in real-time to follow the mobiles. Instead, a cell's zone and beam-spot configuration is periodically reconfigured to handle changing mobile unit traffic patterns. As an example, during morning rush hour, highways into the city are often areas of heavy mobile concentration (high average mobile unit density). At this time, the system will form a high capacity zone of small beam-spots around the dense traffic patterns. If, during lunch hour, the heavy mobile concentration moves to a restaurant area, the system reconfigures the beam-spots to form a high capacity zone around the restaurant area and a medium capacity zone around the highways. Alternatively, the system may employ mobile traffic pattern information from previous days to help predict new zone concentrations.

In summary, the present invention has many advantages. Its communication capacity is as high as that of a conventional smart antenna system because spatial filtering is maintained, however, real-time beam forming and mobile tracking, the expensive and complicated components of conventional smart antennas, are not present. The present invention is also less expensive than a fixed microcell system with equal radio capacity. Additionally, when installed in an area previously containing a single conventional microcell, the present invention can cover a high traffic area inside of the cell while introducing less interference than the conventional method of creating new sectors within a preexisting cell.

It will be apparent to those skilled in the art that various modifications and variations can be made to the present invention without departing from the scope or spirit of the invention. It is intended that the specification and examples be considered as exemplary only, with the true scope and spirit of the invention being indicated by the following claims.

We claim:

1. A method of communicating between a base station and a mobile unit located within a cell of a cellular communication system comprising the steps of:

radiating an array of geographically spaced beam-spots within the cell, each of said beam-spots having a plurality of communication channels and at least one of the communication channels being assigned to the mobile unit;

sensing, at the base station, received signal strength of the mobile unit communicating in the cell; and radiating the communication channels assigned to the mobile unit to a selected number of beam-spots based on the received signal strength from the mobile unit.

2. The method of claim 1, including the step of selecting the number of beam-spots based on a dwell time of the mobile unit.

3. The method of claim 1, wherein the selected beam-spots are determined according to the greatest received signal strength.

4. The method of communicating as defined in claim 1, wherein the method of communicating is applied to a plurality of cells arranged in a network.

5. The method of claim 1, the step of radiating an array of geographically spaced beam-spots includes the substep of rearranging the array of geographically spaced beam-spots based on a traffic pattern of mobile units within the cell.

6. A method of communicating with a mobile unit in a cell of a radio telephone system, comprising the steps of:

radiating an array of geographically spaced beam-spots, each of said beam-spots having a plurality of communication channels;

selectively activating at least one channel, within each beam-spot, assigned to mobile units using the telephone system, the step of selectively activating including the substep of deactivating the channels assigned to the mobile unit in a first one of the beam-spots which the mobile unit has left and activating the channels in a second one of the beam-spots being entered by the mobile unit;

monitoring traffic patterns in the cell;

determining, based on the monitoring step, whether the traffic patterns have changed by more than a predetermined amount;

controlling a multi-beam antenna array to reform the beam-spots in accordance with a change in traffic patterns if the change has exceeded the predetermined amount.

7. The method of claim 6, wherein the step of monitoring further includes the step of sensing the traffic load by monitoring the number of active channels in the beam-spots.

8. The method according to claim 7, wherein the determination step includes the substep of analyzing changes in average mobile density.

9. The method of communicating as defined in claim 6, wherein the method of communicating is applied to a plurality of cells arranged in a network.

10. A method of communicating with a mobile unit in a cell of a radio telephone system comprising the steps of:

radiating an array of geographically spaced beam-spots, each of said beam-spots having a plurality of communication channels;

selectively activating at least one channel, within each beam-spot, assigned to mobile units using the telephone system, the step of selectively activating including the substep of deactivating channels associated with beam-spots the mobile unit has passed and activating channels the mobile unit is estimated to enter;

monitoring traffic patterns in the cell;

determining, based on the monitoring step, whether the traffic patterns have changed by more than a predetermined amount;

controlling a multi-beam antenna array to reform the beam-spots in accordance with a change in traffic patterns if the change has exceeded the predetermined amount.

11. The method of claim 10, wherein the step of monitoring further includes the step of sensing the traffic load by monitoring the number of active channels in the beam-spots.

12. The method according to claim 10, wherein the determination step includes the substep of analyzing changes in average mobile unit density.

13. The method of claim 10, wherein the substep of analyzing which beam-spot the mobile unit will enter includes the substep of detecting a previous direction of the mobile unit.

14. The method of communicating as defined in claim 10, wherein the method of communicating is applied to a plurality of cells arranged in a network.

15. A radio-based telephone system comprising:

an adaptive antenna array for providing reconfigurable beam-spots within a predefined area, each beam-spot containing one or more channels assigned to mobile units using the telephone system; and control means for selectively activating the channels to deactivate the channel assigned to the mobile unit when a mobile unit exits a first beam-spot and to activate the channel assigned to the mobile unit when the mobile unit enters a second of the beam-spots.

16. The telephone system of claim 15, further including receivers for determining the exiting and entering.

17. The telephone system of claim 16, wherein the receivers further include means for measuring signal strength from the mobile units, and wherein the control means includes means for activating the channel assigned to the mobile unit based on the strongest signal.

18. A cell in a radio telephone network comprising:

base station means for controlling mobile unit telephone traffic in a cell, the base station including:

means for dividing the cell into zones arranged according to the number and location of mobile units within the cell, one of the zones being a high capacity zone, and one of the zones being a lower capacity zone;

means for covering the zones with beam-spots, the number of beam-spots and the size of each beam-spot within the zones being determined according to traffic patterns of the mobile units within the zones;

wherein the means for dividing further includes means for reconfiguring the zones based on a change in the traffic patterns within the cell and the means for covering including means for reconfiguring the beam-spots based on a change in the traffic patterns of the mobile units within the zones.

19. The cell of claim 18, further comprising a plurality of base stations arranged in a network.

20. The cell of claim 18, further including control means for selectively activating channels assigned to the mobile units to deactivate the channels assigned to a mobile unit when the mobile unit exits a first of the beam-spots and to activate the channels assigned to the mobile unit when the mobile unit enters a second of the beam-spots.

21. A method of communicating with mobile units in a cell of a radio telephone system, comprising the steps of:

dividing the cell into zones arranged according to a number and location of mobile units within the cell, one of the zones being a high capacity zone, and one of the zones being a lower capacity zone;

covering the zones with beam-spots, the number of beam-spots and the size of each beam-spot within the zones being determined according to traffic patterns of the mobile units within the zones;

reconfiguring the zones based on a change in the traffic patterns of the mobile units within the cell and reconfiguring the beam-spots based on a change in the traffic patterns of the mobile units within the zones.

22. The method of claim 21, further including the step of selectively activating channels assigned to the mobile units to deactivate the channels assigned to a mobile unit when the mobile unit exits a first of the beam-spots and to activate the channels assigned to the mobile unit when the mobile unit enters a second of the beam-spots.

23. The method of claim 21, the step of reconfiguring the zones and the step of reconfiguring the beam-spots being based on previous traffic patterns.

* * * * *